Dec. 20, 1960
W. T. RENTSCHLER
2,965,011
DIAPHRAGM SETTING DEVICE FOR A PHOTOGRAPHIC CAMERA
Filed Sept. 3, 1957
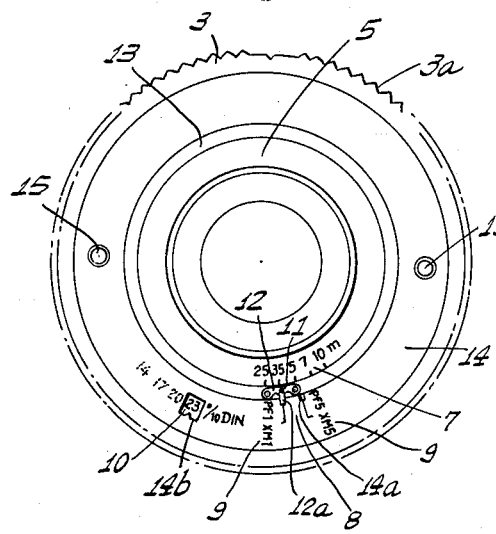
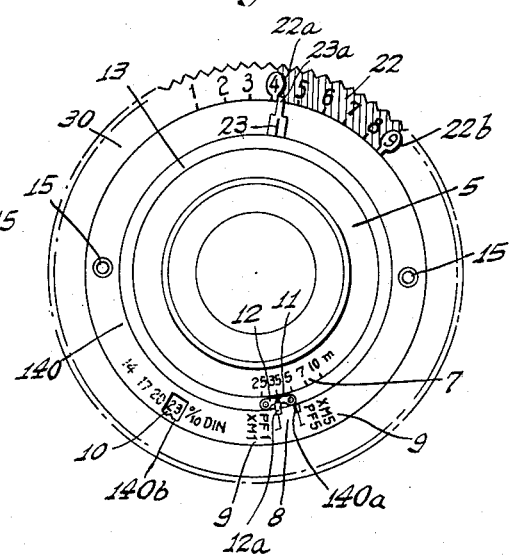
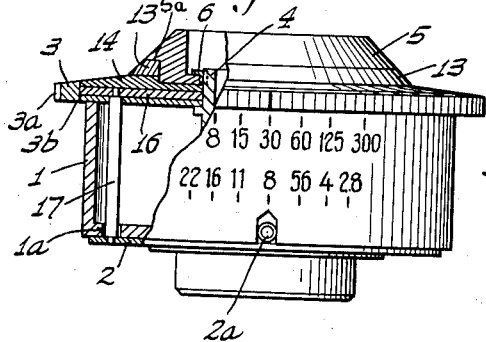
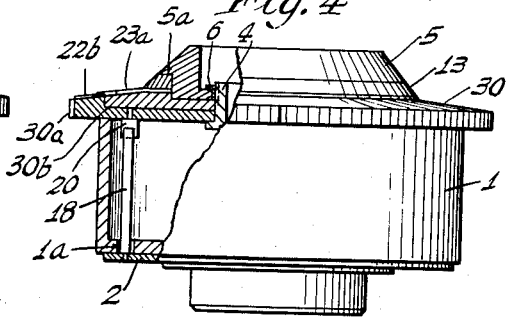
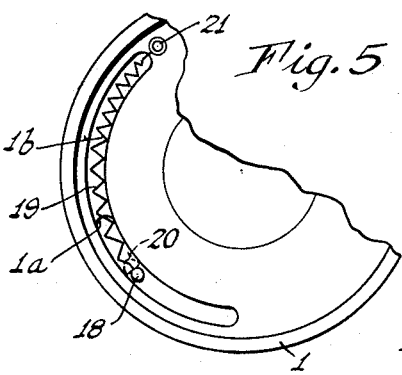
INVENTOR.
Waldemar T. Rentschler
BY
Munn, Liddy, Daniels & March
ATTORNEYS United States Patent Office 2,965,011
Patented Dec. 20, 1960

2,965,011

DIAPHRAGM SETTING DEVICE FOR A PHOTOGRAPHIC CAMERA

Waldemar T. Rentschler, Calmbach (Enz), Germany, assignor to Alfred Gauthier, G.m.b.H., Calmbach (Enz), Germany, a corporation of Germany Filed Sept. 3, 1957, Ser. No. 681,620

Claims priority, application Germany Sept. 4, 1956

11 Claims. (Cl. 95—64)

This invention relates to setting or adjustment means for photographic cameras, and more particularly to means for determining the proper setting for the diaphragm opening in a camera.

In photography, when flash exposures are employed the diaphragm value which must be used is mainly dependent on the type of flash lamp, on the distance, and also on the film sensitivity. Heretofore, the diaphragm values have been calculated in a well known manner from so called "guide numbers" which are calculated so as to be correct for a certain film sensitivity, such guide numbers being usually the product of the diaphragm value multiplied by the distance. To facilitate the calculation or determination of the correct diaphragm value, there are also provided charts which may be followed, as well as auxiliary devices in the form of slide rules, lightning calculators and the like.

With such charts and calculating devices the operator is not required to employ arithmetic in arriving at the proper diaphragm setting; however, the use of such auxiliary devices is circumstantial in that they may be forgotten, or misplaced. Often it is inconvenient to take these devices along on a trip, and in all instances their use is tied up to certain particular flash devices. Additionally, the calculating of the various values and transferring of the same to the camera shutter necessitates a certain amount of time, and always involves a degree of uncertainty as to the accuracy of the final setting.

It is also common practice, in the use of cameras, to utilize a coupling between the diaphragm and distance setting members in order to automatically and easily obtain the proper diaphragm setting for different distances. This necessitates, however, the provision of a scale wherein the setting marks for the diaphragm as well as for the distance are equidistant and related to each other by the factor 2. In carrying out such a condition there is involved an appreciable expenditure and cost, particularly if the distance adjustment is effected by means of a displacement of the front lens.

Moreover, with well known cameras wherein such a coupling device is provided, said device may be used only for a small number of flash lamp types, and only for certain film sensitivities.

The above drawbacks and disadvantages of these prior devices are obviated by the present invention, and one object of the invention is to provide a novel and improved setting or adjustment means for the diaphragm, and/or diaphragm and shutter speed, which is incorporated entirely in the camera or camera shutter or lens structure, and which eliminates the necessity for charts, slide rules, lightning calculators and the like.

Another object of the invention is to provide a novel and improved setting or adjustment means as above characterized, which takes into consideration all of the various film sensitivities and types of flash lamps.

A further object of the invention is to provide a novel and improved setting or adjustment means in accordance with the foregoing, which is extremely simple in its construction and economical to fabricate and to incorporate in camera shutter or lens structures.

In accomplishing the above objects there is provided by the invention a novel organization of settable members having scales or indicia, all related to each other in a manner to enable the desired result, i.e. the diaphragm and/or diaphragm and speed settings to be obtained by a simple adjustment procedure on the part of the user. The organization provided by the invention includes a distance scale and a second scale cooperable with the distance scale, which second scale has indicia representative of different types flash lamps. The scale having the representative indicia is connected with an index or setting mark which is associated further with another or additional scale carrying film sensitivity values. This latter scale is operatively connected with the diaphragm setting member of the shutter or lens structure so as to be movable therewith. Also, there may be optionally provided between the first-mentioned distance scale and the scale having representative indicia, a shiftable auxiliary mark to facilitate the coordination of said scales.

In another embodiment of the invention the film sensitivity scale is movable with the speed-setting member, and the latter is coupled to the diaphragm-setting member in a novel manner whereby concurrent movement of such setting members takes place for part of the range of movement of the speed-setting member only. Thereafter, the speed-setting member may be moved throughout the rest of its range without movement of the diaphragm-setting member occurring.

In both embodiments of the invention it is possible to mount the various scales and carrier members therefor in a number of different ways and in different locations, as will be apparent as the detailed description is followed. Some of the scales and their carriers may be made rigid and immovable, or be made shiftable while others are made rigid and immovable. Accordingly, the scope of the invention is to be taken not from the detailed description which follows, but more properly in connection with the appended claims.

Various additional features and advantages of the invention will hereinafter appear.

In the drawings accompanying this specification, similar characters of reference indicate corresponding parts wherever possible in the several views, in which:

Figure 1 is a front view of a photographic lens shutter having a diaphragm setting or adjusting device executed in accordance with the invention.

Fig. 2 is a side elevational view partly in cross section, of the shutter structure shown in Fig. 1.

Fig. 3 illustrates a modification of the invention, being a front elevational view of a photographic lens shutter structure incorporating a different form of diaphragm setting or adjusting device made in accordance with the invention. In the form of the invention illustrated in Fig. 3 the diaphragm setting and shutter speed members are coupled to each other for simultaneous movement during part of the range of movement of the speed setting member.

Fig. 4 is a side elevational view, partially in cross section, of the shutter structure shown in Fig. 3.

Fig. 5 is a detail showing part of the coupling means provided between the diaphragm- and speed-setting members of the shutter structure of Figs. 3 and 4.

Referring now to the figures, the numeral 1 marks the housing of a photographic lens and shutter structure. At the rear of the housing 1 there is provided a shiftable diaphragm setting ring 2, and carried at the front of the housing 1 is a speed setting ring 3 (in Figs. 3 and 4 designated 30) having a knurled rim 3a (labelled 30a in Figs. 3 and 4). The speed setting ring 3 (or ring 30) is rotatably mounted in the well known manner on the nozzle 4 of the shutter base plate (not shown), said ring being held in place by an assemblage including a fixed front plate 5 and a threaded ring or nut 6, the latter being screwed on to the nozzle 4.

For the purpose of enabling a correct diaphragm value to be easily and quickly obtained without the use of charts, slide rules, lightning calculators and the like, and for all types of flash lamps and various film sensitivities, there is provided in accordance with the invention a pair of scales 7 and 8, disposed at the front of the shutter structure. The scale 7 is a distance scale, and the scale 8 has various indicia representative of different types of flash lamps. Further, associated with the scale 8 is a setting mark 14b (in Figs. 3 and 4 designated 140b) cooperable with a film sensitivity scale 10. While such scales may be optionally mounted either for movement or in a fixed position, according to different arangements as will be later more fully brought out, in the embodiment of the invention illustrated in Figs. 1 and 2 the distance scale 7 is carried by the fixed front plate 5 so as to be immovable with respect to the shutter and lens structure.

The scale 8 having the indicia representative of different types of flash lamps may be provided on a carrier ring 14 (designated 140 in Fig. 3 and 4) which is then shiftab'e or rotatably movable with respect to the front plate 5 and scale 7. The setting mark 14b (or 140b) may be constituted as a window in the carrier ring 14 (or ring 140), through which window portions of the film sensitivity scale 10 may be viewed. Referring to Fig. 2, a moveable flat ring 16 may be provided behind the ring 14, to constitute a carrier for the scale 10.

Adjustment of the carrier ring 14 (or ring 140) on which the scale 8 is provided may be easily effected through the provision of finger-engageable pins 15 secured so as to project from the front surface of the ring, as seen in Figs. 1 and 3.

The scale 8 is shown as being provided with tradenames of different makes of flash lamps, such names serving as indicia of the said scale. However, the scale 8 may be constituted to have the usual figures, which may be equivalent to guide numbers calculated for a certain film sensitivity, for instance 17/10 DIN. It will be understood that such guide numbers are obtained by multiplying the diaphragm number by the distance. In the scale 8 the guide numbers could be provided in addition to the tradenames, in order to further facilitate the adjustment for different types of flash lamps. Or, the scale 8 could also consist of symbols having different shapes of lamps and/or colors, thereby to represent different forms of flash lamps. Also, the scale 8 could include a sequence of differently colored symbols, as for example dots or panels.

In the embodiment of the invention illustrated in Figs. 1 and 2 the setting member for the diaphragm opening is constituted as two parts shiftable with respect to each other. One of said parts comprises the ring 16 which is connected to the diaphragm-setting ring 2 so as to be shiftable therewith. The ring 16 carries the film sensitivity scale 10. The other part comprises the carrier ring 14, on which the scale 8 is provided, such carrier ring also having the setting mark 14b in the form of the window through which the film sensitivity scale 10 may be viewed.

As already stated, the front plate 5 which is fixed, serves as the carrier for the distance scale 7 which cooperates with the indication scale 8. With the above organization each of the three scales 7, 8 and 10 is arranged on a different individual carrier member or ring, and accordingly a maximum degree of clarity is obtained, making for quick and easy operation.

To facilitate the coordination of the scales 7 and 8 there is further provided, by the present invention, an auxiliary reference or setting mark which is movably mounted and made to be cooperable with both the said scales. As shown in Fig. 1, I provide a carrier ring 13 disposed between the front plate 5 and the carrier ring 14, and place on the ring 13 an auxiliary mark 11 to which the scales 7 and 8 may be referred. The carrier ring 13 is preferably mounted in a recess 5a in the front plate 5, as seen in Fig. 2.

With this arrangement any one designation on the scale 8 may be indicated by the reference mark 11, and such mark may be brought opposite any of the numbers on the scale 7 to enable the two scales to be easily coordinated. The mark 11 will provide at a glance the relative settings of the scales 7 and 8, and tends to eliminate any error in such settings. Preferably the carrier ring 13 with its auxiliary mark 11 is releasably coupled to one of the carriers for the scales 7 and 8. I at present prefer to couple the ring 13 and mark 11 to the member 14 which has the scale 8, for the reason that such coupling need not be changed as frequently as a coupling made between the ring 13 and the fixed front plate 5. In this connection it will be understood that the type of flash lamp which is used is not changed as often as the distance factor, when taking pictures. Thus, once the auxiliary mark 11 and ring 13 are coupled to the carrier 14 and scale 8, fixing the type of flash lamp, this coupling may be retained and not disturbed so long as the same flash lamp is utilized. However, changes in the distance of the subject from the camera will necessitate a change in the relative positions of the auxiliary mark 11 with respect to the scale 7, and such change is made quite often, whenever the distance of the subject from the camera is changed. Thus, I effect a simpler and more efficacious setting by such releasable coupling than would be obtained if the auxiliary mark 11 were coupled to the stationary front plate 5.

The releasable coupling means may be advantageously in the form of a resilient member 12 secured to the ring 13 and having a flexible arm or pawl 12a adapted to be received in notches 14a in the carrier member 14, such notches being coordinated with the indicia marks on the scale 8.

I have found that, by making the carrier members 13, 14 and 16 in the form of concentric rings disposed about the fixed front plate 5, a simple and advantageous construction is effected, together with a simple and easily understood arrangement of the scales. The carrier ring 13 for the auxiliary mark 11 is shown as disposed adjacent the outer periphery of the front plate 5, Figs. 2 and 4, whereas the ring 14 carrying the scale 8 is arranged between the front plate 5 and the speed setting ring 3. In order to not increase the axial dimension of the shutter structure, and to obtain a closed appearance of the same, the rings 13 and 14 are arranged in recesses 5a and 3b respectively in the front plate 5 and front surface of the speed setting ring 3.

With the organization as above provided in Figs. 1 and 2, wherein the carrier member 14 has a window 14b revealing the film sensibility scale 10 which is carried by the ring 16 located under or in back of the ring 14, a simple and effective construction is had which is reliable at all times in its operation. Adjustment for film sensitivity may be easily made, since there is presented to the view of the operator only one value at a time, through the window 14b. The adjustment for film sensitivity is effected by shifting the carrier ring 14, through engagement of the pins 15 by the fingers.

As seen in Fig. 2, the carrier ring 16 is connected with the diaphragm-setting ring 2 by means of a tie member 17 which projects through the shutter housing, passing through arcuate slots in the back wall of the housing and in the speed setting ring 3.

The carrier ring 14 may be connected with the carrier ring 16 by any suitable well-known friction device, or the two rings may be connected together by a positive drive. To obtain this latter, for example, one of the manually engageable pins 15 could be arranged for axial shifting movement and its end could be accommodated in bores provided in the ring 16, such bores being coordinated with the marks of the film sensitivity scale 10. Where, as in the embodiment shown in Figs. 3–5, the speed setting ring 30 is provided with the scale 10, the axially movable pin 15 could be received in bores provided in the speed setting ring 30.

Referring now to Figs. 3–5, the ring 16 is not provided and the speed setting ring 30 shown therein constitutes the settable member for effecting speed adjustment as well as diaphragm adjustment, and has the film sensibility scale 10, values of which may be viewed through the window 140b of the ring 140. Therefore, to obtain a given exposure adjustment the operator need actuate only a single setting member, this being the speed setting ring 30. The setting of such member is done neither according to a time scale nor a diaphragm scale, but instead according to an exposure-value scale such as the scale 22 shown in Fig. 3, which is provided on the speed setting ring 30. Each exposure value or number on the scale 22 corresponds to a certain speed-diaphragm value pair. The scale 22 is referrable to a fixed index mark 23, as shown. Referring to Figs. 4 and 5, the connection between the speed-setting ring 30 and the diaphragm-setting ring 2 is effected by abutting drive members in conjunction with an extension coil spring. As shown, a pin 18 is affixed to the diaphragm ring 2 and projects forwardly into the interior of the shutter housing 1 through a slot 1a provided at the rear wall of the housing. Engageable with the front extremity of the pin 18 is a lug 20 carried by the speed setting ring 30. Connected to the pin 18 is an extension spring 19, the other end of which is secured to a pin 21 fixed on the shutter housing 1. The spring 19 occupies an arcuate slot 1b in the interior of the shutter housing 1, and normally tends to maintain the pin 18 in engagement with the lug 20. The speed-setting ring 30 may be held in its marked end positions by any well known notched device, as will be understood.

With shutters of the type set forth in Figs. 3–5, the present invention has special advantage because the operator when setting according to exposure values does not know which diaphragm aperture is coordinated with which speed setting or exposure value. Heretofore, when taking flash exposures, the operator was fully dependent on charts where the coordination of certain exposure values to distances and film sensitivity is listed. Thus, shutters which might be easily adjusted when taking pictures in day light, proved to be quite complicated and disadvantageous when being set for flash exposures.

However, in accordance with the present invention, the setting of shutters wherein a coupling is provided between the diaphragm and speed-setting members is made quick and easy, without the use of charts, slide rules or other lightning calculators and the like.

In accordance with the present invention, the coupling between the speed-setting and diaphragm-setting members is effected in such a manner that simultaneous movement of such members occurs over only a portion of the full range of movement of the speed-setting member. Setting marks lying within this portion of the range of movement are equidistant and represent diaphragm-opening values having values related to each other by a factor of 2. By this arrangement of the setting device a very simple adjustment is obtained for flash exposures, which adjustment does not necessitate any calculation or computation on the part of the operator.

With the setting device shown in Figs. 3–5 the upper range of exposure values on the scale 22, for example the range from 4 to 9, is representative of the shortest speeds to be obtained with the shutter, and this is the entire range of adjustment of the diaphragms, from the smallest to the largest openings thereof. The exposure value settings below the number 4 on the scale 22 are all characterized by the maximum opening of the diaphragm, together with the longer shutter speeds. Preferably the shutter speed at the exposure value 4 on the scale 22 is such as to guarantee non-blurring pictures taken by hand, i.e. speeds in the range of $1/30$ of a second to $1/100$ of a second. By a well-known flash synchronization device all of the common types of flush lamps may be utilized in connection with this non-blurring shutter speed.

In order to apprise the operator of the range over which the diaphragm openings are changed according to the factor 2, that is, to make clear to the operator the range over which the diaphragm opening is adjusted there may be provided, in accordance with the invention, limit marks perceptible to the eye or sensitive to the touch.

Referring to Fig. 3, the area on the scale 22 disposed between the numbers 4 and 9 may be provided with a suitable coloring, as indicated by the surface shading shown in this zone. Also, symbols 22a and 22b may be provided respectively at the numbers 4 and 9, and these symbols may be raised so that they may be readily felt or made perceptible to the touch. The symbols 22a and 22b may have the configuration of flash lamps, for example.

Moreover, the end positions represented by the numbers 4 and 9 may be made perceptible to the sense of touch by the use of a releasable locking device which may come into action when the number 4 is reached, preventing further clockwise turning of the speed setting ring 30 until the locking device is released. Such locking device may be in the form of a resilient finger 23a having an extremity which is engageable with the raised configurations at the numbers 4 and 9. Upon the finger 23a being lifted, the speed setting ring 30 may be shifted further clockwise beyond the number 4 setting, so as to attain the slower shutter speeds represented by the numbers 1, 2 and 3. Instead of actuating the finger 23a manually, the finger may be so constituted by the provision of a camming surface thereon that it will be lifted upon the application of a stronger clockwise turning force applied to the speed-setting ring 30, as will be readily understood.

With such organization comprising the raised symbols 22a and 22b and the resilient finger 23a there is prevented with certainty any unnoticed movement of the speed setting ring 30 in a clockwise direction beyond the setting value represented by the number 4. Such organization is, however, slightly more costly than merely providing markings on the scale 22 in the form of a colored zone, or colored outlines such as the configurations 22a and 22b.

While in the embodiments of the invention illustrated herein the various scales and index marks are arranged in a particular manner, some fixed, and others relatively movable, it will be understood that the invention is not to be limited to the specific arrangement illustrated and described. Instead, other arrangements are possible, to suit the special conditions of the particular camera which is to be provided with the improved setting or adjustment means of the invention.

In accordance with the device of the present invention as above illustrated, a semi-automatic diaphragm setting for flash exposures, considering a pre-set film sensitivity, is effected as follows:

Referring first to Figs. 1 and 2, the setting of the speed setting ring 3 is carried out in accordance with that indicated by the marks on the scale 8, for the particular type of flash lamps which is to be employed. With M-flash lamps and X-synchronization of the shutter, such speed setting for example might be $1/30$ of a second, whereas when using an electronic flash any speed may be used. By means of the auxiliary mark 11, the type of flash lamp to be used is adjusted at the scale 8.

The diaphragm value coordinated to the type of flash lamp used, as well as the distance of the subject which is to be taken, is now adjusted by setting the diaphragm setting ring 2, by means of its handle 2a, to present the auxilary mark 11 opposite the desired distance value on the scale 7. If, in the case of a flash exposure, a film is to be used which has another film sensibility than the one previously used, this is taken into consideration by setting the new film sensibility at the shutter. To effect this, the ring 14 is turned by means of the actuating handles 15, until the proper sensibility value is brought into view at the window 14b provided in the ring 14.

Referring now to the embodiment of the invention of Figs. 3–5, by virtue of the coupling between the speed-setting and diaphragm-setting rings 30 and 2, presetting of the speed is omitted. Therefore, only the type of flash lamp which is to be used is adjusted by coordinating the index mark 11 with the proper index on the scale 8. This is done by disengaging the coupling arm 12 from the notches 140a of the carrier member and shifting the ring 13 with respect to the ring 140 to align the index 11 with the proper flash mark on the scale 8. The arm 12 is then released, to enable it to engage a new notch 140a so as to lock the rings 13 and 140 in new relative positions. Then, the speed-setting ring 30 is turned until the mark 11 is brought opposite the desired distance value on the scale 7.

When turning the speed setting ring 30, it must be noted that the shifting is done only within the exposure value range included between the numbers 4 and 9 on the scale 22, such range representing the full adjustment range of the diaphragm opening.

It should also be noted that the distance setting scale 7 has equi-spaced marks or graduations which are related to each other by a factor of the square root of 2. These graduations must not be identical with the distance-setting scale of the picture-taking lens. Such latter scale may rather possess another graduation value, and is preferably disposed at a location different from that of the scale 7. This reveals a special advantage of the device of the present invention, by which a simple and safe semi-automatic diaphragm setting with flash exposures is obtainable, without regard to the characteristics of the lens distance setting. Presupposing that the device is set for the proper film sensitivity as determined by the scale 10 and cooperable index, the instructions for operating the diaphragm setting with the device of the present invention are briefly as follows: (1) The picture taking lenses are set to the proper distance. (2) The diaphragm setting member is shifted to present the mark 11 opposite the designation on the distance scale 7 which corresponds to the distance number just set for the picture-taking lenses.

No further operations or calculations are required on the part of the user, and therefore, a proper setting of the diaphragm as provided by the device of this invention is effected with the utmost of simplicity, safety and reliability, by the employment of a structure which is extremely simple and economical to fabricate and assemble. Moreover, the device of the present invention provides an accurate setting or adjustment for films of any sensitivity, and flash lamps of any type.

Variations and modifications of the invention may be made within the scope of the claims, and portions of the improvements may be used without others.

I claim:

1. A device for determining the proper setting for the diaphragm opening for a photographic camera, comprising a base; a setting member movably mounted on the base, adapted to actuate the diaphragm to increase or decrease the opening thereof; means connected with said setting member for concurrent movement therewith, providing a film-sensibility scale; a lamp-type indicator device disposed adjacent said sensibility scale-providing means and movable with respect thereto, having indicia representative of different types of flash lamps, and providing a setting mark referable to said sensibility scale-providing means; a device providing a distance scale, said device being cooperable with said lamp-type indicator device to provide distance indications; and means comprising a part adjacent the distance scale and lamp-type indicator device, providing a reference mark for said distance-scale providing device and for said lamp-type indicator device.

2. The invention as defined in claim 1, in which the part providing a reference mark comprises a member movably mounted with respect to the base, and in which there is means releasably connecting said member to one of the said devices to which the reference mark is referable, for concurrent movement therewith at different relative positions with respect thereto.

3. The invention as defined in claim 2, in which the part providing the reference mark is releasably connected to the lamp-type indicator device.

4. The invention as defined in claim 1, in which there is a speed-setting member adapted to actuate the speed-setting mechanism of a shutter, and means coupling the said setting members with each other for concurrent movement throughout a part only of the range of the speed-setting member, and in which there is means providing an exposure-value scale by which different positions of the diaphragm setting member may be indicated, said exposure-value scale having equi-spaced divisions related to each other by the factor 2.

5. The invention as defined in claim 4, in which there is means indicating the range of concurrent movement of the speed-setting diaphragm-setting members.

6. The invention as defined in claim 5, in which the means for indicating the range of concurrent movement includes a scale having spaced markings indicating the limitations of such movement.

7. The invention as defined in claim 5, in which there is a releasable lock for limiting the movement of the speed-setting and diaphragm-setting members to the said range of concurrent movement, release of said lock enabling the speed-setting member to be shifted beyond the said range.

8. The invention as defined in claim 2, in which there is a photographic shutter carried by the base, a front plate disposed forwardly of the shutter, and a speed-setting ring disposed behind the said front plate, in which the lamp-type indicator device and the device providing the distance scale comprise rings concentrically located about the shutter axis, the part providing the reference mark being disposed adjacent the said front plate and the ring constituting the lamp-type indicator device being disposed between said front plate and said speed setting ring.

9. The invention as defined in claim 8, in which there are recesses in the front plate and speed setting ring, carrying the said two rings comprising the lamp-type indicator device and the means providing the reference mark.

10. The invention as defined in claim 1, in which the lamp-type indicator device comprises a ring disposed in front of the sensibility-scale providing means, said ring having a window constituting the said reference mark referable to the said film sensibility scale.

11. The invention of defined in claim 1, in which the indicia representative of different types of flash lamps consists of symbols of different shape and color.

References Cited in the file of this patent

UNITED STATES PATENTS

| | | |
|---|---|---|
| 2,213,749 | Strauss | Sept. 3, 1940 |
| 2,351,834 | Phillips | June 20, 1944 |
| 2,590,161 | Dorsey | Mar. 25, 1952 |

FOREIGN PATENTS

| | | |
|---|---|---|
| 442,409 | Great Britain | Feb. 7, 1936 |
| 1,014,063 | France | May 21, 1952 |
| 1,114,903 | France | Dec. 26, 1955 |